(12) United States Patent
Lin et al.

(10) Patent No.: US 8,139,899 B2
(45) Date of Patent: Mar. 20, 2012

(54) INCREASING RESOLUTION OF VIDEO IMAGES

(75) Inventors: Ruei-Sung Lin, Schaumburg, IL (US); Boaz Super, Westchester, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1077 days.

(21) Appl. No.: 11/923,044

(22) Filed: Oct. 24, 2007

(65) Prior Publication Data
US 2009/0110332 A1 Apr. 30, 2009

(51) Int. Cl.
*G06K 9/32* (2006.01)

(52) U.S. Cl. ... 382/300; 382/298; 382/299; 375/E7.188; 375/E7.248

(58) Field of Classification Search .............. 382/100, 382/298, 299, 300; 375/E7.104, E7.106, 375/E7.123, E7.164, E7.256, 240.16
See application file for complete search history.

(56) References Cited

U.S. PATENT DOCUMENTS

| | | | |
|---|---|---|---|
| 5,185,817 A * | 2/1993 | Degi et al. ............. | 382/300 |
| 5,774,129 A | 6/1998 | Poggio et al. | |
| 6,449,595 B1 | 9/2002 | Arslan et al. | |
| 6,466,702 B1 * | 10/2002 | Atkins et al. .......... | 382/300 |
| 6,556,196 B1 | 4/2003 | Blanz et al. | |
| 7,203,381 B2 * | 4/2007 | Motomura et al. ..... | 382/299 |
| 7,218,796 B2 * | 5/2007 | Bishop et al. ......... | 382/299 |
| 2005/0078124 A1 | 4/2005 | Liu et al. | |
| 2007/0280351 A1 * | 12/2007 | Takamura et al. ...... | 375/240.11 |
| 2010/0231593 A1 * | 9/2010 | Zhou et al. ........... | 345/428 |

FOREIGN PATENT DOCUMENTS
WO 03005306 A1 1/2003

OTHER PUBLICATIONS

Ruei-Sung Lin, et al.; "Learning Nonlinear Manifolds from Time Series"; University of Illinois at Urbana-Champaign, Urbana, IL 61801 USA & Honda Research Institute, Mountain View, CA 94041, USA, 2006.

Goeksel Dedeoglu, et al.; "High-Zoom Video Hallucination by Exploiting Spatio-Temporal Regularities"; The Robotics Institute, Carnegie Mellon University, Pittsburgh, PA 15213, Jul. 2004.

* cited by examiner

*Primary Examiner* — Stephen R Koziol

(57) ABSTRACT

A method and apparatus for increasing resolution of video images are disclosed. Vectors may be produced based on a sequence of video frames. Low dimensional vectors may be produced from the vectors. Groups of at least two of the low dimensional vectors may be interpolated to produce respective low dimensional interpolated vectors. Each of the low dimensional vectors and the interpolated low dimensional vectors may be mapped, according to a model, to obtain dimensionally increased image information. Aspects of the image information may be included in corresponding video frames and corresponding interpolated video frames.

14 Claims, 4 Drawing Sheets

INCREASING RESOLUTION OF VIDEO IMAGES

BACKGROUND OF THE INVENTION

1. Field of the Invention

The invention relates to devices and methods for processing video images, and in particular, processing devices and methods for increasing resolution of video images.

2. Introduction

In existing video systems, video quality may be degraded under certain conditions. For example, in low light conditions a slow shutter speed may be used, which may reduce the frame rate. As a result, movement within a video image may appear choppy. In addition, video may be compressed to save bandwidth. However, various video compression techniques may cause some video information to be lost. As a result, video reproduced from compressed video may be of lesser quality than an original version of the video.

SUMMARY OF THE INVENTION

A method and apparatus are provided for increasing resolution of video images. In one embodiment, vectors may be produced from a sequence of video frames. Each of the vectors may then be dimensionally reduced to produce a low dimensional vector. Each of the video frames may include an image of an object. Each of the low dimensional vectors may be dimensionally increased by mapping it to a high dimensional vector according to a model. The model may include a manifold of image information with respect to images of the object or other objects similar to the object. The model may include a mapping from a high dimensional vector space to a low dimensional vector space and may include a mapping from a low dimensional vector space to a high dimensional vector space. Aspects of the image information, represented by the high dimensional vectors, may be included in the video frames to increase resolution of at least a portion of the video frames.

In another embodiment consistent with the subject matter of this disclosure, vectors may be produced based on a sequence of video frames. Each of the vectors may be dimensionally reduced to produce a low dimensional vector. Each of the video frames may include an image of an object. Pairs of the low dimensional vectors may be interpolated to produce respective low dimensional interpolated vectors. Each of the low dimensional vectors and the interpolated vectors may be dimensionally increased by mapping each respective one of the low dimensional vectors and the interpolated vectors to a respective high dimensional vector according to a model. The model may include a manifold having image information with respect to images of the object or other objects similar to the object. Aspects of the image information, represented by the high dimensional vectors, may be included in the video frames and may be used to create interpolated video frames.

In a variation of the above-mentioned embodiments, forward predicted video frames may be produced based on one or more preceding video frames. Vectors may be produced based on a sequence of video frames. Each of the vectors may be dimensionally reduced to produce a respective low dimensional vector. Each of the video frames may include an image of an object. The low dimensional vectors may be extrapolated to produce respective low dimensional extrapolated vectors. Each of the low dimensional vectors and the low dimensional extrapolated vectors may be dimensionally increased by mapping each of the low dimensional vectors and the low dimensional extrapolated vectors to a respective high dimensional vector according to a model. The model may include a manifold having image information with respect to images of the object or other objects similar to the object. Aspects of the image information, represented by the high dimensional vectors, may be included in the video frames and may be used to create extrapolated video frames.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
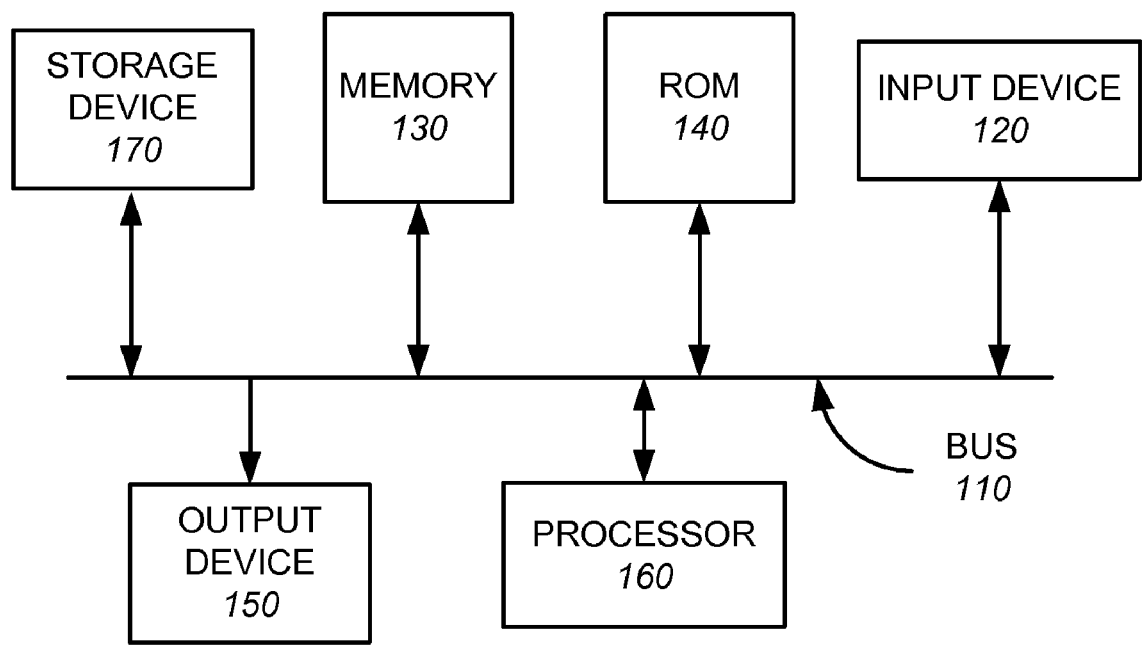
FIG. 1 illustrates an exemplary block diagram of a processing device consistent with the subject matter of this disclosure.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

In a first aspect of the invention, a method and an apparatus are provided for increasing resolution of a video image. Vectors in a vector space may be produced based on a sequence of video frames. Each of the vectors may represent an image of an object, such as, for example, a face, or other object. Each of the vectors may be dimensionally reduced by mapping each of the vectors to a respective low dimensional vector according to a first model. The first model may include a manifold of image information with respect to images of the object or other objects similar to the object. The first model may include a mapping from a high dimensional vector space to a low dimensional vector space and may include a mapping from a low dimensional vector space to a high dimensional vector space. Groups of two or more of the low dimensional vectors may be interpolated to produce a low dimensional interpolated vector. The low dimensional interpolated vector may be dimensionally increased by mapping the low dimensional interpolated vector to a high dimensional interpolated vector according to a second model. The second model may include a manifold of image information with respect to images of the object or other objects similar to the object. The second model may include a mapping from a high dimensional vector space to a low dimensional vector space and may include a mapping from a low dimensional vector space to a high dimensional vector space. In some embodiments, the first model and the second model may be the same model. In other embodiments, the first model and the second model may be different models. An interpolated video frame may be produced based on the high dimensional interpolated vector. In a case in which the image information with respect to images of the object or other objects similar to the object has a higher resolution, with respect to an original resolution, in the second model, then a resolution of the image of the object included in the interpolated video frame may be increased relative to the original resolution. Similarly, in a case in which the image information with respect to images of the object or other objects similar to the object has a lower resolution, with respect to an original resolution, in the second model, then a resolution of the image of the object included in the interpolated video frame may be decreased relative to the original resolution.

In variations of the above-mentioned aspects of the invention, forward predicted video frames may be produced based one or more preceding video frames. Vectors in a vector space may be produced based on a sequence of video frames. Each of the vectors may represent an image of an object, such as, for example, a face, or other object. Each of the vectors may be dimensionally reduced by mapping each of the vectors to a respective low dimensional vector according to a first model. The first model may include a manifold of image information with respect to images of the object or other objects similar to the object. The first model may include a mapping from a high dimensional vector space to a low dimensional vector space and may include a mapping from a low dimensional vector space to a high dimensional vector space. One or more of the low dimensional vectors may be extrapolated to produce a low dimensional extrapolated vector. The low dimensional extrapolated vector may be dimensionally increased by mapping the low dimensional extrapolated vector to a high dimensional extrapolated vector according to a second model. The second model may include a manifold of image information with respect to images of the object or other objects similar to the object. The second model may include a mapping from a high dimensional vector space to a low dimensional vector space and may include a mapping from a low dimensional vector space to a high dimensional vector space. The first and second models may be the same model or different models. An extrapolated video frame may be produced based on the high dimensional extrapolated vector. In a case in which the image information with respect to images of the object or other objects similar to the object has a higher resolution, with respect to an original resolution, in the second model, then a resolution of the image of the object included in the extrapolated video frame may be increased relative to the original resolution. Similarly, in a case in which the image information with respect to images of the object or other objects similar to the object has a lower resolution, with respect to an original resolution, in the second model, then a resolution of the image of the object included in the extrapolated video frame may be increased relative to the original resolution.

FIG. 1 is a block diagram that illustrates an exemplary processing device 100, which may be used to implement embodiments consistent with the subject matter of this disclosure. Processing device 100 may include a bus 110, an input device 120, a memory 130, a read only memory (ROM 140, an output device 150, a processor 160, and a storage device 170. Bus 110 may permit communication among components of processing device 100. Processing device 100 may be a desktop personal computer PC), a notebook PC, a host computer, a handheld processing device, or other type of processing device.

Processor 160 may include at least one conventional processor or microprocessor that interprets and executes instructions. Memory 130 may be a random access memory (RAM), or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include any type of media for storing data and/or instructions.

Input device 120 may include one or more conventional mechanisms that permit video to be input to processing device 100, such as, for example, a USB port or other input port for receiving the video. Output device 170 may include one or more conventional mechanisms that output information, including one or more displays, as well as other output devices, such as a USB port or other output port for outputting processed video.

Processing device 100 may perform such functions in response to processor 160 executing sequences of instructions contained in a tangible machine-readable medium, such as, for example, memory 130, or other medium. Such instructions may be read into memory 130 from another machine-readable medium, such as storage device 170, or from a separate device via a communication interface (not shown).

Figure 2:
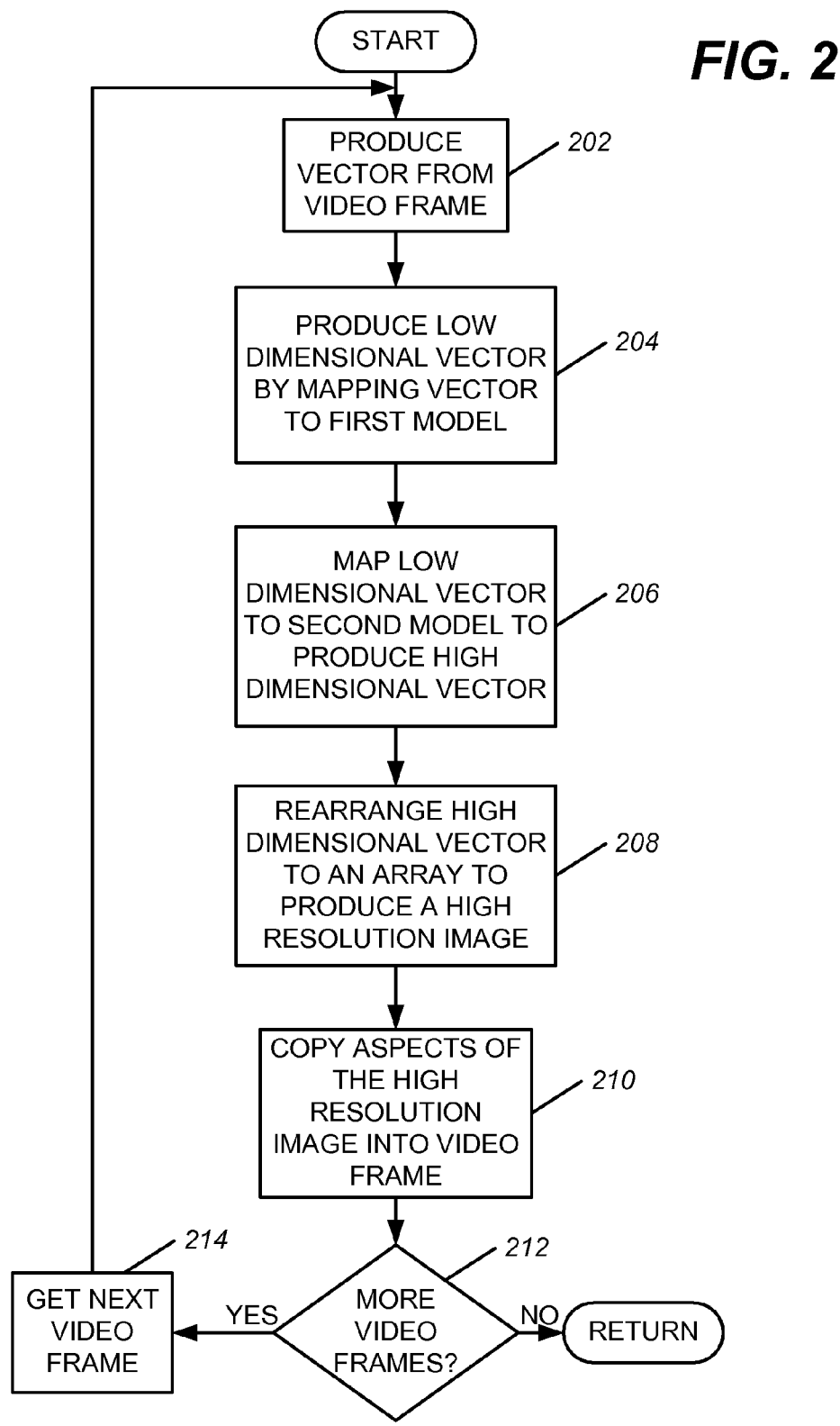
FIGS. 2 and 3 are flowcharts illustrating exemplary processes for increasing resolution of video frames in different embodiments consistent with the subject matter of this disclosure.

FIG. 2 is a flowchart illustrating an exemplary process for performing spatial super-resolution of video frames. Copying information from a model, such as a manifold, to improve resolution of an image in a video frame beyond an original resolution may be called spatial super-resolution. The process may begin with processing device 100 producing a vector from a video frame (act 202). The video frame may include an image of an object, such as, for example, a face, or other object. Producing the vector may be accomplished by processing device 100 converting an array of pixel values, corresponding to the video frame or to a subregion within the video frame, to the vector. For example, an array of 100×100 grayscale pixel values may be converted to a vector having 10,000 elements. For another example, an array of 100×100 red/green/blue (RGB) pixel values may be converted to a vector having 30,000 elements.

Next, processing device 100 may dimensionally reduce the vector by mapping the vector to a corresponding low dimensional vector according to a first model, which may include a manifold of image information with respect to images of the object or other objects similar to the object (act 204). In one embodiment, the first model may include a number of points, each of which may correspond to a vector having 10,000 elements, and all of the points may lie on or near a low dimensional manifold within a 10,000 dimensional vector space. Of course, in other embodiments, the low dimensional manifold may include points representing vectors having a different number of elements. In one embodiment, the low dimensional vector may have 40 elements, or a different number of elements.

Next, processing device 100 may map the low dimensional vector to a high dimensional vector according to a second model, which may include a manifold of image information with respect to images of the object or other objects similar to the object, where the image information of the second model is at a higher resolution than the image information of the first model. (act 206). In one embodiment, the high dimensional vector may include a number of points, each of which may represent a vector having 40,000 elements, or another number of elements. Processing device 100 may then rearrange the high dimensional vector to an array to produce a high resolution image (act 208). Aspects of the high resolution image may be copied to the video frame to increase the resolution of at least a portion of the video frame (act 210). In one embodiment, the aspects of the high resolution image copied to the video frame may include an image of the object. In some embodiments, the portion of the high resolution image may be warped to match an image of the object included in the video frame before copying the aspects of the high resolution image to the video frame. For example, the portion of the high resolution image may be warped to match a size, a position, and a perspective deformation of an image of the object included in the video frame.

Processing device 100 may then determine whether there are additional video frames to process (act 212). If processing device 100 determines that there are no additional video frames to process, then the process may be completed. Otherwise, processing device 100 may get a next video frame (act 214) and repeat acts 202-212.

Figure 3:
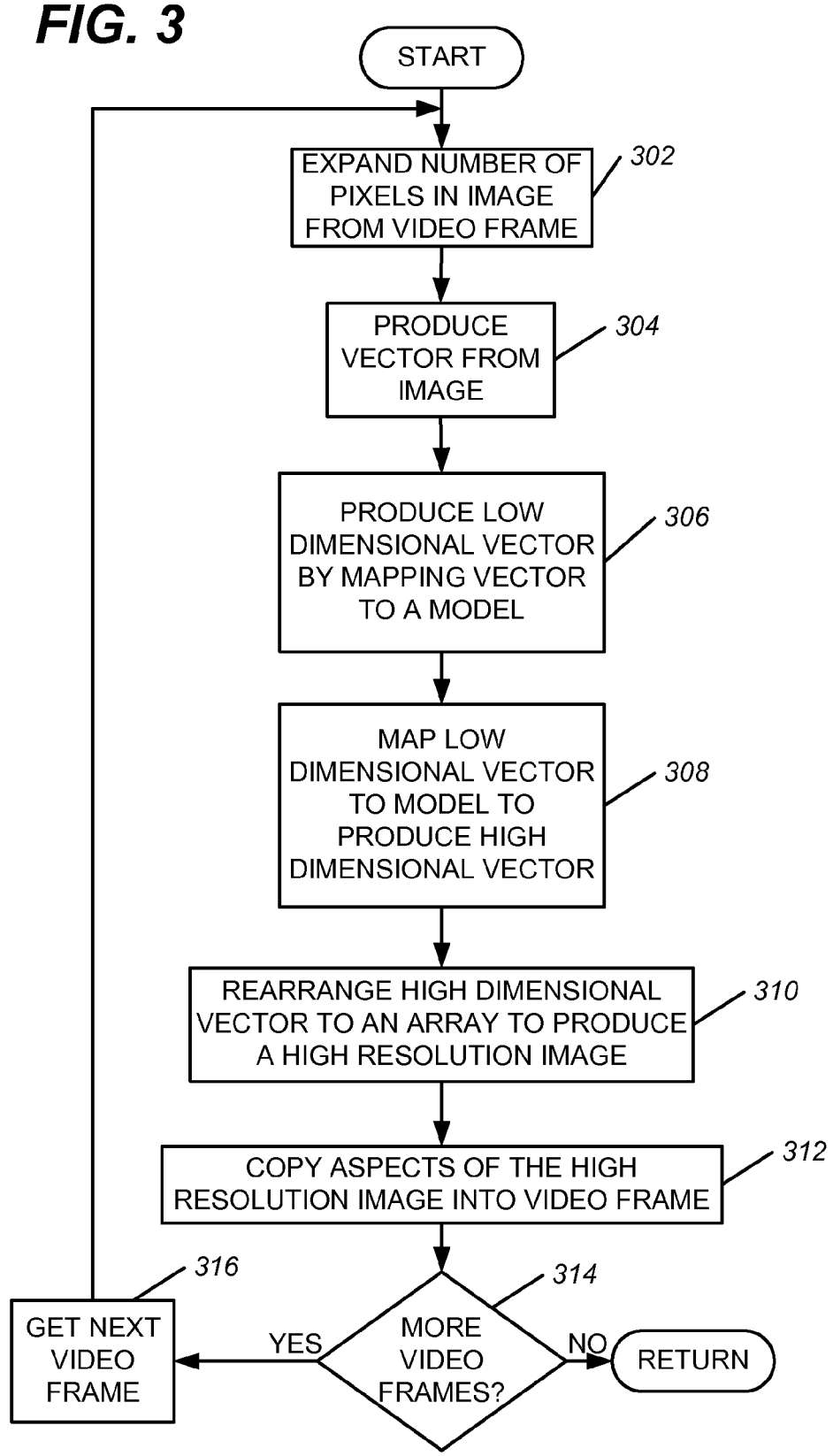

FIG. 3 is a flowchart illustrating a second exemplary process for performing spatial super-resolution of video frames. Each video frame may include an image of an object, such as, for example, a face, or other object. The process may begin with a processing device 100 expanding a number of pixels in an image from a video frame (act 302). Such an expansion of the number of pixels may be referred to as upsampling. Upsampling may be performed by interpolating groups of pixels to produce new pixels to be inserted into the image. In one embodiment, the interpolation may be performed by bilinear interpolation. In other embodiments, other methods of interpolation may be performed. Thus, for example, an image having 100×100 pixels may be expanded to an image having 200×200 pixels. Of course, in other embodiments, images may have different numbers of pixels.

Processing device 100 may then produce a vector based on the image (act 304). Thus, for example, if an image includes 200×200 pixels, then processing device 100 may produce a vector having 40,000 elements.

Processing device 100 may then dimensionally reduce the vector by mapping the vector to a corresponding low dimensional vector according to a model, which may include a manifold of image information with respect to images of the object or other objects similar to the object (act 306). In one embodiment, the model may include a number of points, each of which may correspond to a vector having the same number of elements as the vector based on the image. Continuing the above example, each point in the model may have 40,000 elements, and all of the points may lie on or near a low dimensional manifold within a 40,000 dimensional vector space. Of course, in other embodiments, the low dimensional manifold may include points representing vectors having a different number of elements. In one embodiment, the low dimensional vector may have 40 elements, or a different number of elements.

Processing device 100 may then map the low dimensional vector to a high dimensional vector according to the model, such as, for example a vector having 40,000 elements, or another suitable number of elements (act 308).

Processing device 100 may then rearrange the high dimensional vector to an array to produce a high resolution image (act 310). Continuing the above example, the high resolution image might be 200×200 pixels in the case of a high dimensional vector having 40,000 elements. Aspects of the high resolution image may be copied to the video frame to increase the resolution of at least a portion of the video frame (act 312). For example, at least a portion of the high resolution image, perhaps including an image of an object, such as a face or other object, may be copied to the video frame. In some embodiments, the portion of the high resolution image may be warped to match an image of the object included in the video frame before copying the aspects of the high resolution image to the video frame. For example, the portion of the high resolution image may be warped to match a size, a position, and a perspective deformation of an image of the object included in the video frame.

Processing device 100 may then determine whether there are additional video frames to process (act 314). If there are no additional video frames, then the process may be completed. Otherwise, processing device 100 may get a next video frame (act 316) and acts 302-314 may be repeated.

Numerous methods for dimensionally reducing the vector based on the image by mapping the vector to a corresponding low dimensional vector according to a model are well-known. One method for producing low dimensional vectors based on images may include a non-linear dimensional reduction algorithm, which may include learning a non-linear mapping from image data, including images of an object in various positions, to low dimensional vectors. The non-linear dimensional reduction algorithm may produce the low dimensional vectors based on vectors derived from video frames. In some embodiments, the model may include a manifold and the object may be a face or other object. An example of a non-linear dimensional reduction method is described in "Learning Nonlinear Manifolds from Time Series", by Ruei-Sung Lin, Che-Bin Liu, Ming-Hsuan Yang, Narendra Ahuja, and Steven Levinson, *Proceedings of the Ninth European Conference on Computer Vision (ECC 2006)*, vol. 3, pp. 239-250, Gray, Austria, May, 2006, published by Springer, the contents of which are incorporated herein by reference in its entirety. The method may use probabilistic models to describe a generating process for x and y, which may be high and low dimensional vectors, respectively, under which, the probabilistic distributions of $P(y|x)$ and $P(x|y)$ are defined. Based on these distributions, mapping from x to y may be defined as $E[P(y|x)]$ and mapping from y to x may be defined as $E[P(x|y)]$.

A second well-known method, which may be used in embodiments consistent with the subject matter of this disclosure, is an invertible function approach. In this approach, an invertible parametric function may be used to describe a mapping from x to y. Because the function is invertible, an inverse mapping from y to x may be computed directly.

A third well-known method, which may be used in embodiments consistent with the subject matter of this disclosure, is a non-parametric approach. In this approach, given a data set of $\{y\}$ or $\{(x, y)\}$, a bijection mapping is a nonparametric model having the data set as part of a number of parameters. Remaining parameters may be derived by solving an optimization problem formulated according to local geometric relationships among samples in the data set.

The above-mentioned methods for producing low dimensional vectors, based on video frames, and for performing an inverse operation are exemplary. In other embodiments, other methods for producing low dimensional vectors, based on video frames, and for performing an inverse operation may be employed.

Figure 4:
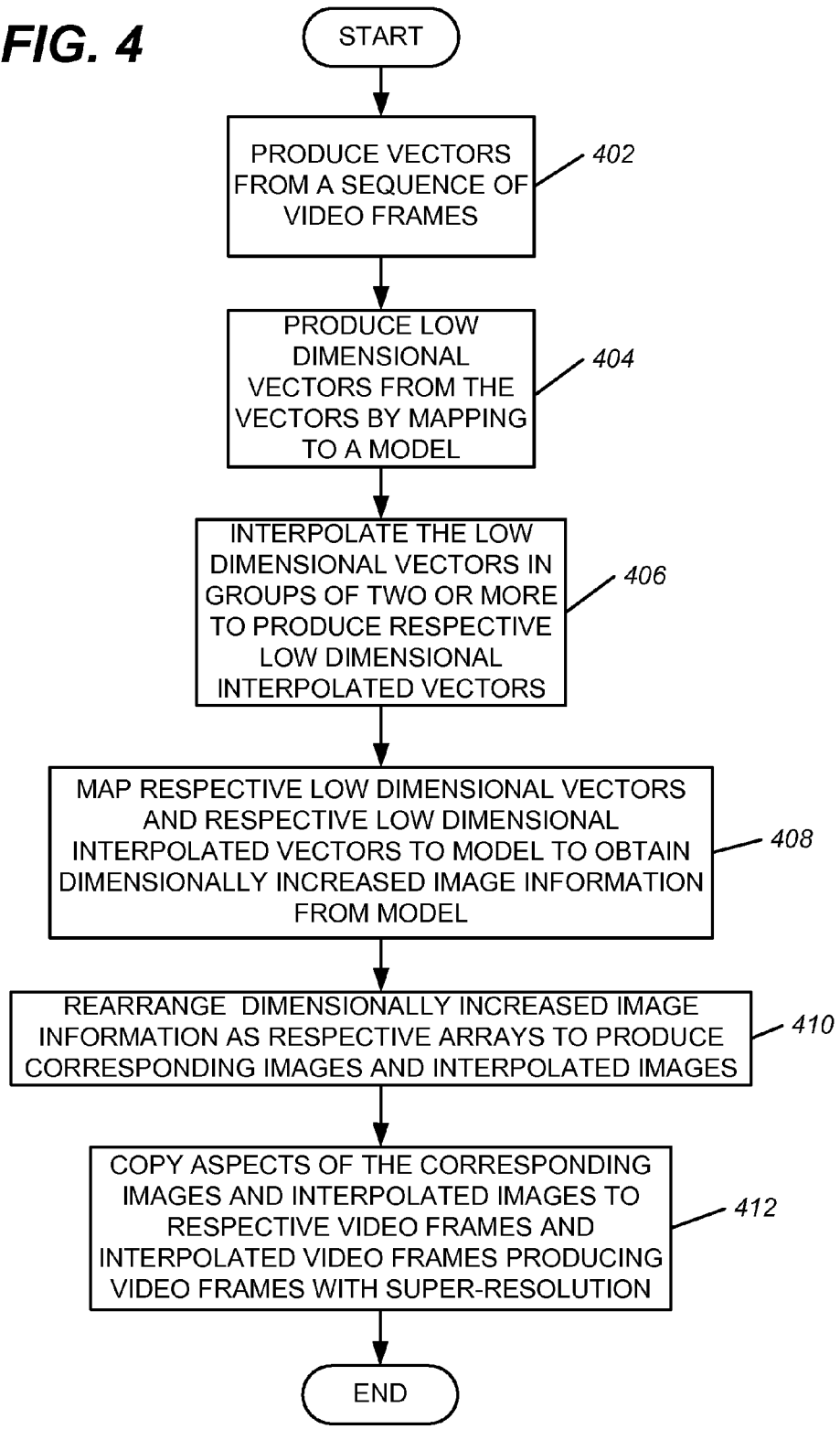
FIG. 4 is a flowchart illustrating an exemplary process for increasing resolution of video by adding interpolated video frames to the video.

In some circumstances, video may appear somewhat choppy. FIG. 4 is a flowchart of an exemplary process for increasing resolution by increasing a number of video frames. Such a process may be referred to as temporal super-resolution.

The process may begin by processing device 100 producing vectors from a sequence of video frames (act 402). Processing device 100 may then dimensionally reduce the vectors by mapping the vectors to corresponding low dimensional vectors according to a model, which may include a manifold of image information with respect to images of the object or other objects similar to the object (act 404). In another embodiment, a low dimensional vector may be produced by performing acts 202 and 204 (FIG. 2). In yet another embodiment, a low dimensional vector may be produced by performing acts 302, 304 and 306 (FIG. 3). In other embodiments, other methods may be used to produce low dimensional vectors.

Next, processing device 100 may interpolate low dimensional vectors, in groups of two or more, to produce a respective low dimensional interpolated vector (act 406). Each of the groups of two or more low dimensional vectors may correspond to two or more consecutive or nonconsecutive video frames. Further, a low dimensional vector may be included in more than one of the groups of two or more low dimensional vectors. For example, assume a sequence of the video frames includes video frame 1, video frame 2 and video frame 3, corresponding to low dimensional vectors 1, 2 and 3. Low dimensional vectors 1 and 2 may be interpolated to produce low dimensional interpolated vector 2a. Low dimensional vectors 2 and 3 may be interpolated to produce low dimensional interpolated vector 3a. Thus, in this example, low dimensional vector 2 may be grouped with low dimensional vector 1, and further, may be grouped with low dimensional vector 3.

Processing device 100 may map, according to the model, each of the low dimensional vectors and the low dimensional interpolated vectors to dimensionally increased image information, which in some embodiments may be corresponding high dimensional vectors and high dimensional interpolated vectors (act 408). The dimensionally increased image information may then be rearranged as respective arrays to produce corresponding images and interpolated images (act 410). Aspects of the corresponding images may be copied to the video frames and aspects of the interpolated images may be copied to interpolated video frames (act 412). In one embodiment, the interpolated video frames may be produced by linear interpolation of groups of two or more video frames. In other embodiments, other video frame interpolation methods may be used. The aspects of the images or interpolated images copied to the corresponding video frames or interpolated video frames may include an image of the object. In some embodiments, a portion of the image or interpolated image may be warped to match an image of the object included in the video frame or the interpolated video frame before copying the aspects of the image or interpolated image to the video frame or the interpolated video frame. For example, a portion of the image or the interpolated image may be warped to match a size, a position, and a perspective deformation of an image of the object included in the video frame or the interpolated video frame. The produced sequence of video frames may have a higher frame rate than the original sequence of video frames as a result of temporal super-resolution. In other embodiments, video frames may be produced with spatial super-resolution.

In other embodiments, a processing device may train a model, which may include a manifold of image information with respect to images of an object, such as, for example, a face, or other objects similar to the object, based on a second sequence of video frames, which may precede the sequence of video frames.

Although the above description may contain specific details, they should not be construed as limiting the claims in any way. Other configurations of the described embodiments of the invention are part of the scope of this invention. For example, aspects of the method may take place in a single device, such as, processing device 100, or may take place in multiple devices communicating via a bus, a network, or a combination of networks including wired networks, wireless networks, public switched data networks, or other types of networks. Further, in other embodiments, the steps of the processes described, with respect to FIGS. 2-4, may include additional or different steps, and the steps may be performed in a different order. Accordingly, only the appended claims and their legal equivalents should define the invention, rather than any specific examples given.

We claim as our invention:

1. A machine-implemented method for improving video resolution, the machine-implemented method comprising:
    producing vectors, each of the vectors representing a respective image of an object appearing in a sequence of video frames;
    producing a respective low dimensional vector from each of the vectors;
    performing interpolation on at least two of the low dimensional vectors to produce a low dimensional interpolated vector;
    mapping the low dimensional interpolated vector according to a model to obtain dimensionally increased image information;
    producing an interpolated image from the dimensionally increased image information;
    producing a video frame interpolated between existing video frames in the sequence of video frames; and
    copying aspects of the interpolated image to the interpolated video frame.

2. The machine-implemented method of claim 1 further comprising:
    performing interpolation on groups of two or more of the low dimensional vectors, each of the groups of two or more of the low dimensional vectors corresponding to two or more respective ones of the video frames, to produce respective low dimensional interpolated vectors;
    mapping the respective low dimensional interpolated vectors according to the model to obtain corresponding ones of the dimensionally increased image information;
    producing respective interpolated images from the corresponding ones of the dimensionally increased image information; and
    copying aspects of the respective interpolated images to interpolated video frames.

3. The machine-implemented method of claim 1 further comprising:
    performing forward prediction based on at least one video frame in the sequence of video frames to produce a forward predicted video frame.

4. The machine-implemented method of claim 1 wherein the model is a manifold.

5. The machine-implemented method of claim 4:
wherein the object is a face; and
wherein the manifold includes image information with respect to faces.

6. The machine-implemented method of claim 4 further comprising:
receiving a second sequence of video frames; and
training the manifold based on the received second sequence of video frames.

7. The machine-implemented method of claim 1 wherein the copying of aspects of the interpolated image to the interpolated video frame further comprises:
warping the interpolated image to produce a warped image; and
copying at least a portion of the warped image to the interpolated video frame.

8. The machine-implemented method of claim 1 further comprising:
mapping each of the low dimensional vectors according to the model to obtain corresponding dimensionally increased image information;
producing respective images from corresponding ones of the dimensionally increased image information; and
copying at least a portion of the produced respective images to corresponding ones of the video frames to produce respective video frames with spatial super-resolution.

9. The machine-implemented method of claim 1 wherein the producing of respective low dimensional vectors from each of the vectors comprises using a nonlinear dimensional reduction algorithm.

10. A machine-implemented method for improving video resolution, the machine-implemented method comprising:
producing vectors, each of the of vectors representing a respective image of an object appearing in a sequence of video frames;
producing a respective low dimensional vector from each of the vectors;
interpolating at least two of the low dimensional vectors to produce an interpolated low dimensional vector;
mapping the interpolated low dimensional vector according to a manifold to produce a high dimensional vector;
rearranging the high dimensional vector as an array;
producing an interpolated video frame between existing video frames in the sequence of video frames, the interpolated frame based on the array; and
including the interpolated video frame in the sequence of video frames.

11. The machine-implemented method of claim 10 further comprising:
training the manifold based on a second sequence of video frames.

12. The machine-implemented method of claim 10 wherein the producing of an interpolated video frame based on the array further comprises:
warping image information, based on the array, to produce warped image information; and
copying at least a portion of the warped image information to the interpolated video frame.

13. The machine-implemented method of claim 10 further comprising:
performing forward prediction of at least one of the video frames in the sequence of video frames to produce a predicted video frame in the sequence of video frames.

14. The machine-implemented method of claim 10 further comprising:
performing spatial super-resolution of at least some of the video frames in the sequence of video frames.

* * * * *